H. H. McANELLY.
CAMERA SHUTTER.
APPLICATION FILED JUNE 22, 1912.

1,088,291.

Patented Feb. 24, 1914.

2 SHEETS—SHEET 1.

Witnesses:
E. E. Wessels
A. A. Olson

Inventor
Homer H. McAnelly,
By Joshua R. H. Potts
his Attorney.

H. H. McANELLY.
CAMERA SHUTTER.
APPLICATION FILED JUNE 22, 1912.
1,088,291.
Patented Feb. 24, 1914.
2 SHEETS—SHEET 2.
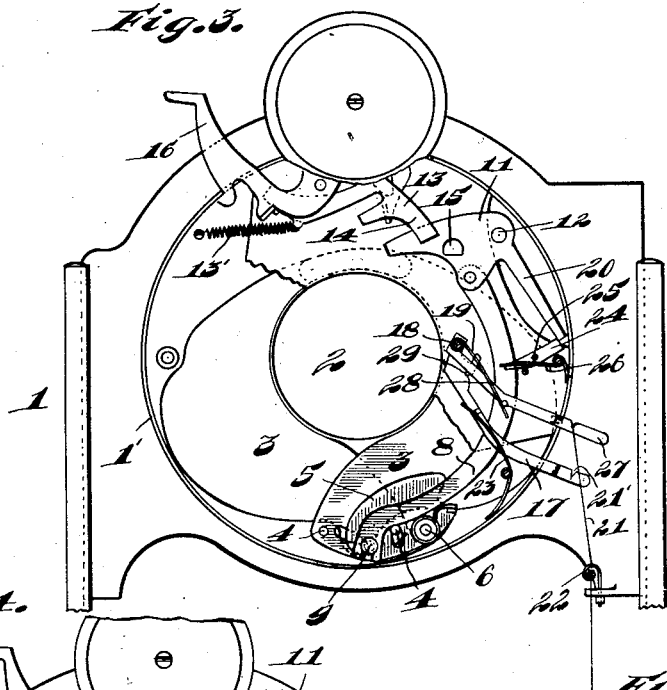
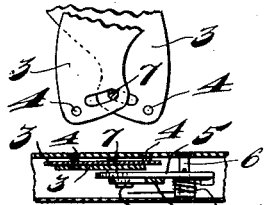
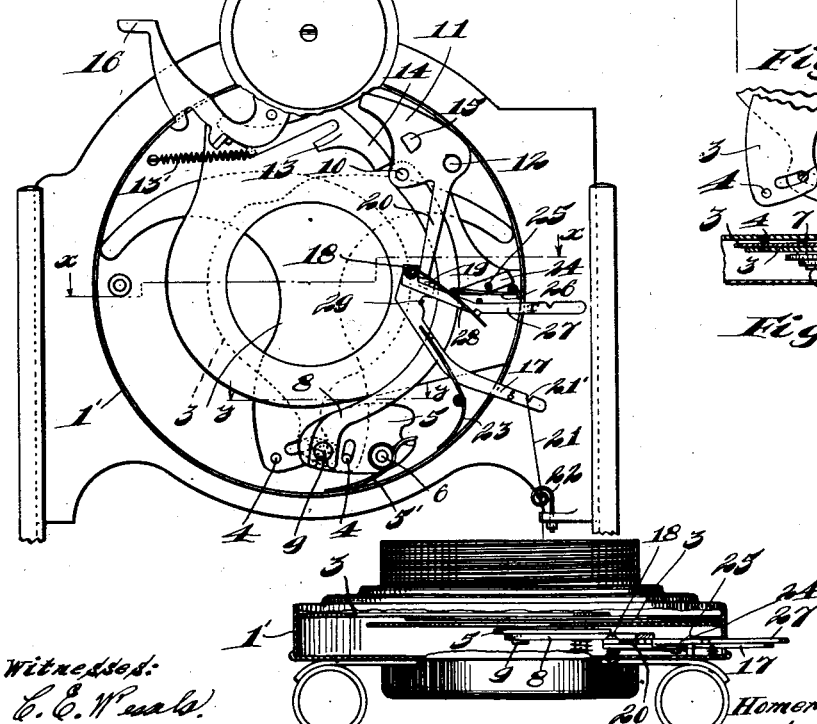
Witnesses:
C. E. Weals.
A. A. Olson.
Inventor:
Homer H. McAnelly,
By Johnson R. Tork
his Attorney.

UNITED STATES PATENT OFFICE.

HOMER H. McANELLY, OF CHICAGO, ILLINOIS.

CAMERA-SHUTTER.

1,088,291.　　　　Specification of Letters Patent.　　Patented Feb. 24, 1914.

Application filed June 22, 1912. Serial No. 705,153.

*To all whom it may concern:*

Be it known that I, HOMER H. MCANELLY, a citizen of the United States, and a resident of the city of Chicago, county of Cook, and State of Illinois, have invented certain new and useful Improvements in Camera-Shutters, of which the following is a specification.

My invention relates to camera shutters and more particularly to the tripping parts of the operating portions thereof.

The object of my invention is to provide a shutter which may be tripped by the operator stationed at a distance from the camera, in order to permit himself to be included in the picture, if desired.

A further object of my invention is the production of shutter of the character mentioned which will be of simple construction and efficient in operation.

Other objects will appear hereinafter.

With these objects in view, my invention consists in the combinations and arrangements of members hereinafter described and claimed.

Figure 1:
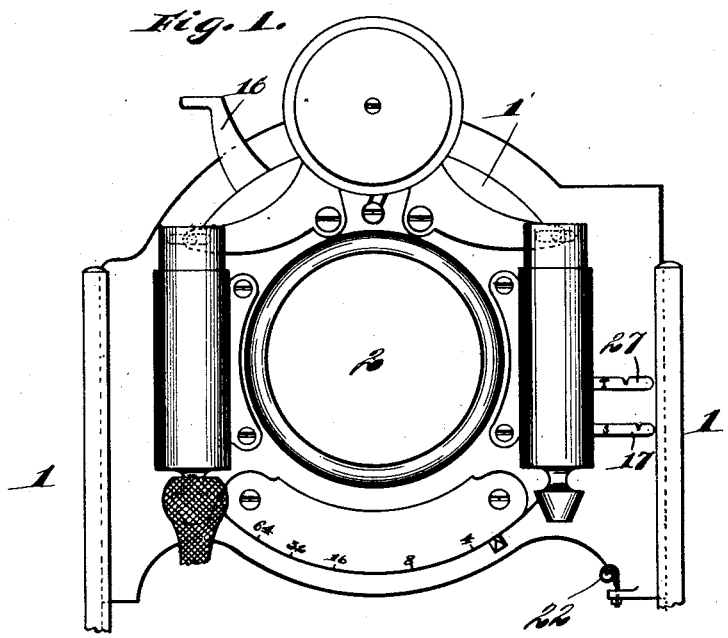
Figure 2:
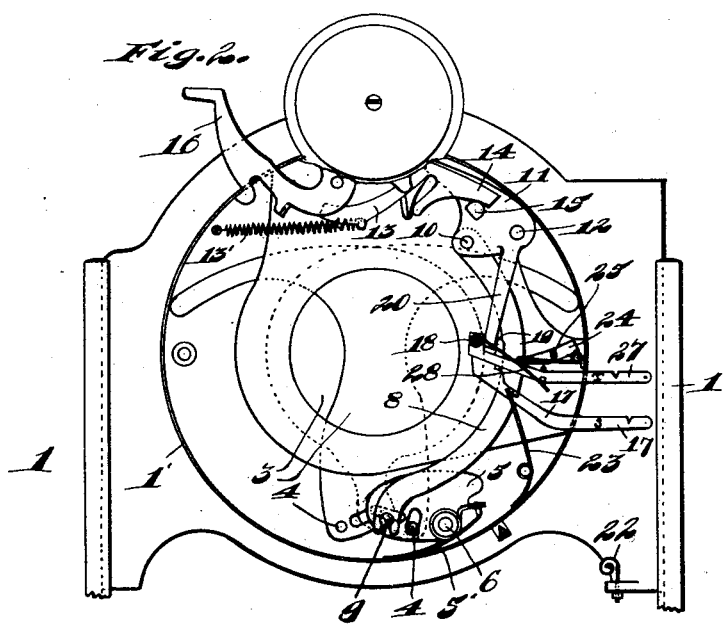

The invention will be best understood by reference to the accompanying drawings forming a part of this specification, and in which;

Figure 1 is a front elevation of a conventional form of camera equipped with tripping mechanism embodying my invention, Fig. 2 is a view similar to Fig. 1 with the front plate of the camera removed, in order to expose underlying parts, the mechanism being illustrated in a position in which the shutter operating mechanism is locked in position for operation, Fig. 3 is a view similar to Fig. 2 in which the tripping mechanism is shown in a position in which the operation of the shutter operating mechanism is interrupted so that the shutter is open for taking a "time" exposure, Fig. 4 is a view similar to Figs. 2 and 3 illustrating the tripping mechanism in which the same has been operated to permit of the taking of a "snap shot" or instantaneous exposure, Fig. 5 is a section taken substantially on line $x$—$x$ of Fig. 4, Fig. 6 is a fragmentary detail section taken substantially on line $y$—$y$ of Fig. 4, Fig. 7 is a fragmentary detail illustrating the mounting of the shutter blades.

Referring now to the drawings I have illustrated therein, the front end portion 1 of a conventional form of camera, in which is provided the central exposure opening 2. Opening 2 is controlled by the shutter blades 3 which are pivotally mounted at 4 at their lower ends so as to move parallel with each other in a plane perpendicular to the axis of said exposure opening, as will be readily understood. The shutter blades 3 are inclosed in the circular casing 1' of the camera and the same are oscillated to close or expose the opening 2 through the medium of an oscillatory plate 5 which is fulcrumed at 6 to the said plate having operative connection with said shutter blades through the medium of a stud 7, which engages elongated slots provided in said shutter blades, as clearly shown in Fig. 7, and so that oscillation of the member 5 will effect simultaneous oscillation of said shutter blades. A torsional spring 5' coöperates with the member 5 so as to normally hold the same in a position in which the shutter blades 3 will close the opening 2, as clearly shown in Figs. 2 and 4. The free end of member 5 is rocked downwardly in order to move the shutter blades to exposing position, through the medium of a link 8, the bifurcated lower end of said link engaging the stud 9, which projects from one side of the member 5 at the free end thereof. The upper end of link 8 is pivotally connected at 10 with an oscillatory member 11, which is pivoted at 12, the arrangement being such that downward rocking of the free end of said member will effect movement of the shutter blades to exposing position, the spring 5' serving to return the shutter members to closing position and said member 11 to initial position when the latter is released. This downward rocking of the member 11 is effected through the medium of an oscillatory member 13, the end 14 of said member being adapted, when moved upwardly, to automatically engage over an inclined stud 15 provided upon the member 11, as clearly shown in Fig. 2, so that when said arm 14 of the member 13 is rocked downwardly to initial position, the member 11 will be simultaneously rocked downwardly to effect the operation before described. A helical tension spring 13' coöperates with the member 13 for rocking the same downwardly as mentioned, when the same is released from a position at its upper terminal of movement, that is from a position engaging behind stud 15. The rocking of member 13 to operative position behind the stud 15 is effected through the medium of an oscillatory lever 16, one end of which projects exteriorly as shown, for engagement and operation by the finger.

A lever 17 is fulcrumed at 18 to the casing 1'. Formed in one side of the lever 17, adjacent the fulcrum 18, is a slot 19, which is adapted to be engaged by the lower extremity of an arm 20 which is formed upon the plate 11, the latter, when the arm 20 is in engagement with slot 19, being locked against oscillatory movement, as will be readily understood. With this arrangement then, when the free end of lever 17 is in elevated position, arm 20 will be engaged thereby and the member 11 locked against operation, so that when said lever is rocked downwardly, after setting of the arm 14 in operative engagement with the stud 15 through operation of the lever 16, said arm 14 will instantly operate upon said stud effecting operative oscillation of the member 11. This operation effects instantaneous exposure or the taking of a "snap shot" with the camera, so that with the present construction, in order to take a "snap shot" it is only required, after the depression of the lever 16 to effect setting of the operating mechanism, to rock lever 17 downwardly. The lever 17 projects exteriorly and a cord or other flexible element 20 coöperates therewith for effecting oscillation thereof. This cord engages a notch 21 provided in said lever and passes through a stationary guide eye 22, so that the same may be extended to any position where the operator may be stationed, in order that the operator may take the picture while positioned in the focus of the camera if desired. If desired a torsional spring 23 may be employed to normally hold the lever 17 at its upper terminal of oscillation. However, this spring is not essential since said lever may be held by friction in either its upper or lower position.

In order to adapt my mechanism for the taking of a "time" exposure, a pawl 24 is provided which is pivoted at 25. Said pawl is positioned in the path of oscillation of the arm 20 and is adapted, when said arm is at its right hand terminal of movement to engage against the same in order to hold said arm in this position and consequently to hold the shutter in exposing position. A torsional spring 26 coöperates with pawl 24 to normally hold the same in operative position, as clearly shown in Fig. 3. Fulcrumed at 18 is a lever 27, coöperating with which is a torsional spring 28. The lever 27 is adapted normally to engage against the rearward end of pawl 24 in order to hold the latter in inoperative position, said pawl moving to operative position under the influence of spring 26 only when said lever 27 is rocked downwardly to release same. Formed upon the lever 17, adjacent the fulcrum 18 is a stop 29 whereby, when the lever 27 is rocked downwardly, said lever 17 will be correspondingly moved, as clearly shown in Fig. 3. With this construction it will be seen that when it is desired to take a "time" exposure, it is only required to effect setting of said shutter operating mechanism through depression of lever 16 and with lever 17 in its elevated or locking position, to rock the exteriorly projecting end of said lever 27 downwardly. Such rocking of the latter causes movement of lever 17, releasing arm 20 and which after released is oscillated as above described to the right. The pawl 24, when said arm reaches its right hand terminal of movement, will engage the same preventing its return movement, and thereby causing the shutter members to be held in exposing position. Said arm 20 will be held in this position, and hence the shutter members in exposing position until arm 27 is released, when the latter will be rocked to initial position through the influence of spring 28 to cause tripping of said pawl. Thus a "time" exposure may be taken with the camera, the taking of such "time" exposure being effected if desired through the manipulation of the cord 20 which may be attached to said lever 27.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention, what I claim as new and desire to secure by Letters Patent, is:

1. A camera shutter comprising a casing; shutter blades pivoted in said casing; an oscillatory member pivoted in said casing; a connection between said member and said shutter blades; means for operating said oscillatory member; an arm on said oscillatory member; a lever pivoted in said casing and having a recess adapted to engage said arm when the latter is in one position; and means for automatically locking said arm when the latter is rocked to another position, substantially as described.

2. A camera shutter comprising a casing; shutter blades pivoted in said casing; an oscillatory member pivoted in said casing; a connection between said member and said shutter blades; means for operating said member; an arm on said oscillatory member; a lever pivoted in said casing and having a recess adapted to engage said arm when the latter is in one position; a spring actuated pawl adapted to lock said arm when rocked to another position; and a second lever pivoted on said casing and adapted to move said pawl from locking position, substantially as described.

In testimony whereof I have signed my name to this specification in the presence of two subscribing witnesses.

HOMER H. McANELLY.

Witnesses:
JOSHUA R. H. POTTS,
ARTHUR A. OLSON.